US011497159B2

(12) United States Patent
Ambros et al.

(10) Patent No.: US 11,497,159 B2
(45) Date of Patent: Nov. 15, 2022

(54) LAWNMOWER AND METHOD OF CLEANING A ROLLING SURFACE OF A WHEEL OF A LAWNMOWER

(71) Applicant: HUSQVARNA AB, Huskvarna (SE)

(72) Inventors: Rickard Ambros, Jönköping (SE); Mats Svensson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 323 days.

(21) Appl. No.: 16/766,080

(22) PCT Filed: Nov. 6, 2018

(86) PCT No.: PCT/SE2018/051136
§ 371 (c)(1),
(2) Date: May 21, 2020

(87) PCT Pub. No.: WO2019/117778
PCT Pub. Date: Jun. 20, 2019

(65) Prior Publication Data
US 2020/0352091 A1 Nov. 12, 2020

(30) Foreign Application Priority Data
Dec. 11, 2017 (SE) .................... 1751516-4

(51) Int. Cl.
A01D 34/00 (2006.01)
A01D 101/00 (2006.01)
(52) U.S. Cl.
CPC ......... A01D 34/003 (2013.01); A01D 34/008 (2013.01); A01D 2101/00 (2013.01)

(58) Field of Classification Search
CPC . A01D 34/003; A01D 34/008; A01D 2101/00
(Continued)

(56) References Cited

U.S. PATENT DOCUMENTS 3,824,772 A 7/1974 Sorenson et al.
3,948,026 A * 4/1976 Whitechester ......... A01D 34/82
56/255
(Continued)

FOREIGN PATENT DOCUMENTS

DE 10048322 A1 4/2002
DE 10156942 A1 5/2003
(Continued)

OTHER PUBLICATIONS

Swedish Search Report for Application No. 1751516-4 dated Jul. 2, 2018.
(Continued)

Primary Examiner — Mahmoud Gimie
(74) Attorney, Agent, or Firm — Burr & Forman LLP

(57) ABSTRACT

A lawnmower (1) is disclosed comprising at least one wheel (3) configured to support the lawnmower (1) during operation. The at least one wheel (3) comprises a rolling surface (5), and the lawnmower (1) comprises a cleaning device (7) configured to clean the rolling surface (5), and an actuator (9) configured to move the cleaning device (7) relative the rolling surface (5). The present disclosure further relates to a method (100) of cleaning a rolling surface (5) of at least one wheel (3) of a lawnmower (1).

17 Claims, 2 Drawing Sheets

(58) Field of Classification Search
USPC .................................................. 56/10.2 A
See application file for complete search history.

(56) References Cited

U.S. PATENT DOCUMENTS

| | | |
|---|---|---|
| 5,265,537 A | 11/1993 | Gasparrini et al. |
| 2003/0145570 A1 | 8/2003 | Berndt et al. |
| 2017/0020064 A1 | 1/2017 | Doughty et al. |

FOREIGN PATENT DOCUMENTS

| | | |
|---|---|---|
| GB | 301978 A | 12/1928 |
| GB | 2386970 A | 10/2003 |
| GB | 2471191 A | 12/2010 |
| WO | 2006056207 A1 | 6/2006 |

OTHER PUBLICATIONS

International Search Report and Written Opinion from International Application No. PCT/SE2018/051136, dated Jan. 16, 2019, all pages herein cited in it's entirety.

\* cited by examiner

LAWNMOWER AND METHOD OF CLEANING A ROLLING SURFACE OF A WHEEL OF A LAWNMOWER

TECHNICAL FIELD

The present disclosure relates to a lawnmower comprising at least one wheel and a cleaning device configured to clean a rolling surface of the at least one wheel. The present disclosure further relates to a method of cleaning a rolling surface of at least one wheel of a lawnmower.

BACKGROUND

A lawnmower is a machine capable of cutting grass using a cutting device. Some lawnmowers comprise a motor, such as an electric motor, or a combustion engine, configured to power the cutting device, and/or configured to provide motive power to the lawnmower. In some lawnmowers, the cutting device is powered by hand. Lawnmowers comprising an electric motor may comprise one or more batteries, or may comprise a power cord, configured to supply electricity to the electric motor. Most lawnmowers comprise wheels configured to support the lawnmower during operation.

As indicated above, various types of lawnmower exist on today's market. Some examples are walk-behind mowers, riding mowers, and self-propelled robotic lawnmowers. A walk-behind mower is a lawnmower usually comprising an elongated handle allowing a user to push, and/or to guide, the lawnmower. Some walk-behind mowers comprise a propulsion arrangement configured to drive one or more wheels of the lawnmower. Walk-behind mowers lacking a propulsion arrangement are sometimes referred to as "push mowers". A riding mower is a mower comprising a seat for a user, a steering device, such as a steering wheel, and a motor configured to provide motive power to the riding mower. A self-propelled robotic lawnmower is a mower capable of cutting grass in areas in an autonomous manner. Some robotic lawnmowers require a user to set up a border wire around a lawn that defines the area to be mowed. Such robotic lawnmowers use a sensor to locate the wire and thereby the boundary of the area to be trimmed. In addition to the wire, robotic lawnmowers may also comprise other types of positioning units and sensors, for example sensors for detecting an event, such as a collision with an object within the area. The robotic lawnmower may move in a systematic and/or random pattern to ensure that the area is completely cut. In some cases, the robotic lawnmower uses the wire to locate a recharging dock used to recharge the one or more batteries.

Various types of lawnmowers, such as those described above, are associated with some mutual problems. One such problem is operational reliability. Another such problem is build-up of grass onto various components of the lawnmower. Still another such problem is the cutting result, which can be subdivided into visual cutting result and uniformity of cutting. The visual cutting result can be defined as the visual cutting result determined by a person viewing a mowed lawn. The uniformity of the cutting can be defined as uniformity of a length of the grass of a mowed lawn, i.e. if straws of the grass in a lawn are cut to a uniform length.

SUMMARY

It is an object of the present invention to overcome, or at least alleviate, at least some of the above-mentioned problems and drawbacks.

According to a first aspect of the invention, the object is achieved by a lawnmower comprising at least one wheel configured to support the lawnmower during operation, wherein the at least one wheel comprises a rolling surface. The lawnmower further comprises a cleaning device configured to clean the rolling surface, and an actuator configured to move the cleaning device relative the rolling surface.

Since the lawnmower comprises a cleaning device configured to clean the rolling surface, and an actuator configured to move the cleaning device relative the rolling surface, the risk of build-up of grass on the rolling surface is significantly reduced. In addition, since the actuator is configured to move the cleaning device relative the rolling surface, the risk of build-up of grass on the cleaning device is also significantly reduced. As a further result thereof, the risk of build-up of grass onto other components of the lawnmower is also reduced, such as components arranged adjacent to the at least one wheel, or adjacent to the cleaning device. Accordingly, a more reliable lawnmower is provided with a potentially improved operational time available before grass must be manually removed from components of the lawnmower.

Further, a lawnmower is provided where the cleaning device may remove grass from the rolling surface of the wheel in a more continuous manner. As a result thereof, the grass may be more evenly distributed from the lawnmower onto a lawn, which improves the visual cutting result, and avoids distribution of clumps of grass onto a lawn.

Still further, since a lawnmower is provided where the risk of build-up of grass onto the rolling surface is significantly reduced, the risk is also significantly reduced of a deteriorated uniformity of the cutting result caused by an obstructed wheel, and/or a changed ride-height of the lawnmower, caused by grass on the rolling surface of the wheel.

Accordingly, a lawnmower is provided overcoming, or at least alleviating, at least some of the above-mentioned problems and drawbacks. As a result, the above-mentioned object is achieved.

Optionally, the cleaning device is configured to clean the rolling surface by abutting against matter on the rolling surface. Thereby, an efficient and reliable cleaning is performed of the rolling surface.

Optionally, the actuator is configured to move the cleaning device relative the rolling surface such that different portions of the cleaning device face the rolling surface. Thereby, an efficient and reliable cleaning is performed of the rolling surface. Further, the risk of build-up of grass on the cleaning device is further reduced.

Optionally, the actuator is configured to rotate the cleaning device around a first rotational axis. Thereby, an efficient and reliable cleaning is performed of the rolling surface. Further, the risk of build-up of grass on the cleaning device is still further reduced. This because grass on the cleaning device will be subjected to a centrifugal force caused by the rotation of the cleaning device.

Optionally, the cleaning device comprises a body and bristles extending from the body. Thereby, an efficient and reliable cleaning is performed of the rolling surface.

Optionally, the cleaning device comprises a peripheral surface, wherein the peripheral surface, at least periodically, faces the rolling surface during movement of the cleaning device, and wherein the bristles cover 2.5%-30%, or 3.5%-20%, or 4%-12.5%, of an area of the peripheral surface. Thereby, an efficient and reliable cleaning is performed of the rolling surface. Further, the risk of build-up of grass on the cleaning device is still further reduced.

Optionally, the bristles cover the peripheral surface in a pattern such that bristles periodically faces the rolling surface in a plane comprising the first rotational axis and a portion of the rolling surface. Thereby, an efficient and reliable cleaning is performed of the rolling surface. Further, the risk of build-up of grass on the cleaning device is still further reduced.

Optionally, the bristles cover the peripheral surface in a spiral pattern along the first rotational axis. Thereby, an efficient and reliable cleaning is performed of the rolling surface. Further, the risk of build-up of grass on the cleaning device is still further reduced.

Optionally, the at least one wheel is arranged to rotate around a second rotational axis, and wherein the first and second rotational axes are substantially parallel. Thereby, an efficient and reliable cleaning is performed of the rolling surface.

Optionally, the lawnmower is configured to move in a forward direction during operation, wherein the at least one wheel is arranged to rotate in a first rotational direction when the lawnmower is moving in the forward direction, and wherein the actuator is configured to rotate the cleaning device in the first rotational direction. Thereby, an efficient and reliable cleaning is performed of the rolling surface. This because during operation, a portion of the cleaning device that faces a portion of the rolling surface, will move in opposite tangential direction than the portion of the rolling surface. Further, a high relative velocity is obtained between the portions. As a further result thereof, the risk of build-up of grass on the cleaning device is still further reduced.

Optionally, the lawnmower is configured to move in a forward direction during operation, and wherein the cleaning device is arranged behind the wheel seen in the forward direction. Thereby, an object that sticks to a portion of the rolling surface, when the portion of the rolling surface is abutting against a ground surface, will travel a relative short distance from the ground surface before being removed from the rolling surface by the cleaning device. As a result thereof, the risk of build-up of grass is significantly reduced on the rolling surface, as well as on other components of the lawnmower. Further, grass on the rolling surface can be removed from the rolling surface in an efficient manner in a direction towards a lawn.

Optionally, the lawnmower is configured to move in a forward direction during operation, wherein the at least one wheel is arranged to rotate in a first rotational direction when the lawnmower is moving in the forward direction, wherein the actuator is configured to rotate the cleaning device in a second rotational direction, opposite to the first rotational direction, and wherein the actuator is configured to rotate the cleaning device in a rotational velocity causing outer radial portions of the cleaning device to obtain a higher tangential velocity than a tangential velocity of the rolling surface. Thereby, a lawnmower is provided capable of cleaning the rolling surface in a more energy efficient manner. This because outer radial portions of the cleaning device that faces a portion of the rolling surface, will move in the same tangential direction as the portion of the rolling surface. Accordingly, outer radial portions of the cleaning device may abut against the rolling surface, or may abut against matter on the rolling surface, and may, as a result thereof, contribute to the rotation of the wheel.

Optionally, the actuator comprises an electric motor. Thereby, an efficient, reliable, and easily controllable cleaning of the rolling surface can be performed.

Optionally, the lawnmower further comprises an adjustment mechanism, wherein the cleaning device is mounted onto the lawnmower via the adjustment mechanism, and wherein the adjustment mechanism is configured to allow adjustment between different relative distances between the cleaning device and the rolling surface. Thereby, a lawnmower is provided allowing adjustments between different relative distances between the cleaning device and the rolling surface of the wheel, for example in dependence of a cleaning need of the rolling surface.

Optionally, the lawnmower comprises a control arrangement configured to control operation of the actuator based on a cleaning need of the rolling surface. Thereby, a still further efficient and reliable cleaning of the rolling surface can be performed. Further, a more energy efficient lawnmower can be provided since the operation of the actuator is controlled based on a cleaning need of the rolling surface. The control of operation of the actuator may encompass a deactivation of the actuator when the cleaning need is below a threshold value and an activation of the actuator when the cleaning need is above the threshold value. Further, according to some embodiments, the control arrangement may be configured to control an operational velocity of the cleaning device based on the cleaning need of the rolling surface.

Optionally, the lawnmower further comprises a sensor, wherein the control arrangement is configured to determine the cleaning need based on data from the sensor. Thereby, an efficient and reliable determining of a current cleaning need can be performed, which provides conditions for performing the cleaning of the rolling surface in a still further efficient, reliable, and energy efficient manner.

Optionally, the sensor is configured to sense at least one of a humidity, a weather condition, and a length of grass, in an environment surrounding the lawnmower. Thereby, an efficient and reliable determining of a current cleaning need can be performed, based on data affecting the cleaning need of the rolling surface, which provides conditions for performing the cleaning of the rolling surface in a still further efficient, reliable, and energy efficient manner.

Optionally, the lawnmower is a self-propelled robotic lawnmower. Thereby, a self-propelled robotic lawnmower is provided in which the risk of build-up of grass on the rolling surface of the wheel, and on the cleaning device, is significantly reduced. As a further result thereof, a more reliable self-propelled robotic lawnmower is provided with a potentially improved operational time available before grass must be manually removed from components of the self-propelled robotic lawnmower.

Further, a self-propelled robotic lawnmower is provided where the cleaning device may remove grass from the rolling surface of the wheel in an even manner. As a result thereof, the grass may be more evenly distributed from the self-propelled robotic lawnmower onto a lawn, which improves the visual cutting result, and avoids distribution of clumps of grass onto a lawn.

Still further, since a self-propelled robotic lawnmower is provided where the risk of build-up of grass onto the rolling surface is significantly reduced, the risk is also significantly reduced of a deteriorated uniformity of the cutting result caused by an obstructed wheel, and/or a changed ride-height of the self-propelled robotic lawnmower, caused by grass on the rolling surface of the wheel.

According to a second aspect of the invention, the object is achieved by a method of cleaning a rolling surface of at least one wheel of a lawnmower, wherein the lawnmower comprises the at least one wheel, a cleaning device, and an actuator, wherein the at least one wheel is configured to support the lawnmower during operation, and wherein the method comprises:

cleaning the rolling surface, using the cleaning device, and moving the cleaning device relative the rolling surface, during the cleaning of the rolling surface.

Thereby, a method is provided reducing the risk of build-up of grass on the rolling surface of the wheel, as well as on the cleaning device. Further, the risk of build-up of grass onto other components of the lawnmower is also reduced, such as components arranged adjacent to the at least one wheel. Thus, a method is provided improving operational reliability of a lawnmower, and potentially improving the operational time available before grass must be manually removed from components of the self-propelled robotic lawnmower.

Further, a method is provided where grass may be removed from the rolling surface of the wheel in an even manner. As a result thereof, a method is provided where the grass may be more evenly distributed from the lawnmower onto a lawn, which improves the visual cutting result, and avoids distribution of clumps of grass onto a lawn.

Still further, since a method is provided where the risk of build-up of grass onto the rolling surface is significantly reduced, the risk is also significantly reduced of a deteriorated uniformity of the cutting result caused by an obstructed wheel, and/or a changed ride-height of the lawnmower, caused by grass on the rolling surface of the wheel.

Accordingly, a method is provided overcoming, or at least alleviating, at least some of the above-mentioned problems and drawbacks. As a result, the above-mentioned object is achieved.

Optionally, the lawnmower further comprises a control arrangement, and wherein the method comprises:

controlling operation of the actuator, based on a cleaning need of the rolling surface.

Thereby, a still further efficient and reliable cleaning of the rolling surface can be performed. Further, the method provides conditions for a more efficient utilization of energy since the operation of the actuator is controlled based on a cleaning need of the rolling surface. The control of operation of the actuator may encompass a deactivation of the actuator when the cleaning need is below a threshold value, and an activation of the actuator when the cleaning need is above the threshold value. Further, according to some embodiments, the control of operation of the actuator may encompass a control of an operational velocity of the cleaning device based on the cleaning need of the rolling surface.

Optionally, the lawnmower further comprises a sensor, and wherein the method comprises:

determining the cleaning need based on data from the sensor.

Thereby, an efficient and reliable determining of a current cleaning need can be performed, based on data affecting the cleaning need of the rolling surface, which provides conditions for performing the cleaning of the rolling surface in a still further efficient, reliable, and energy efficient manner.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
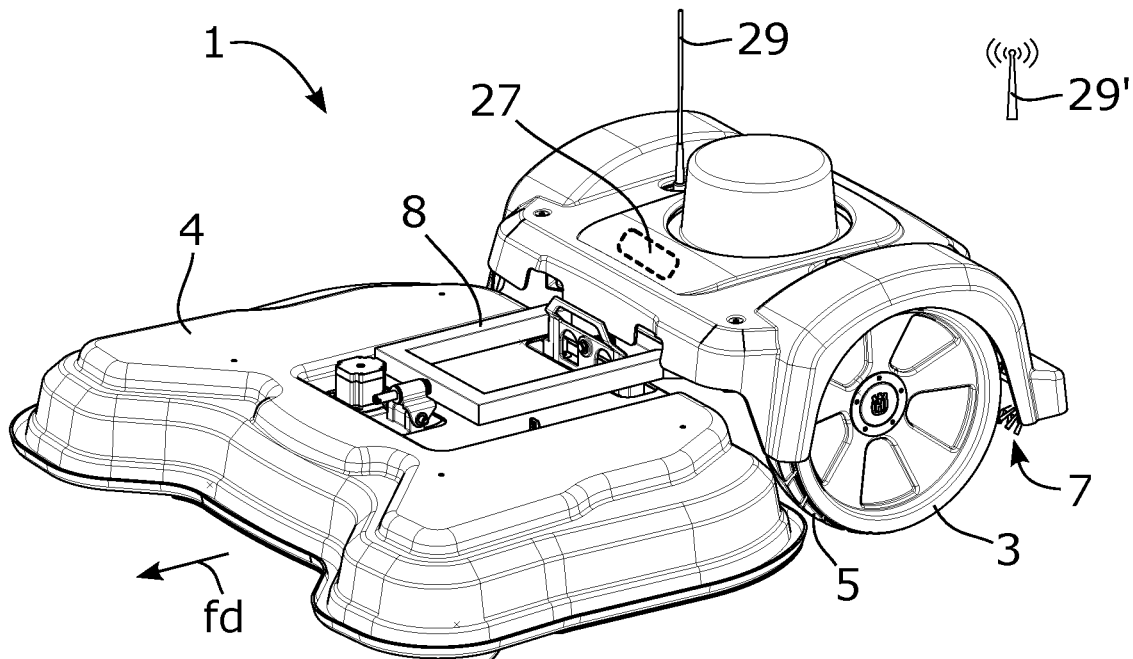
FIG. 1 illustrates a lawnmower, according to some embodiments.

FIG. 1 illustrates a lawnmower 1, according to some embodiments. According to the illustrated embodiments, the lawnmower 1 is a self-propelled robotic lawnmower 1. According to further embodiments, the lawnmower 1, as referred to herein, may be another type of lawnmower, such as a push mower, a walk-behind mower, or a riding mower.

The lawnmower 1 comprises wheels 3 configured to support the lawnmower 1 during operation. In FIG. 1, only one wheel 3 is indicated with the reference sign "3". However, the lawnmower 1, according to the illustrated embodiments, comprises four wheels configured to support the lawnmower 1 during operation of the lawnmower 1. The lawnmower 1 comprises a cutting unit 4 configured to cut grass during operation of the lawnmower 1. The wheel 3 comprises an annular rolling surface 5 configured to abut against a ground surface, such as a lawn, upon rotation of the wheel 3, during operation of the lawnmower 1. The lawnmower 1 further comprises a cleaning device 7 configured to clean the rolling surface 5 during operation of the lawnmower 1.

Figure 2:
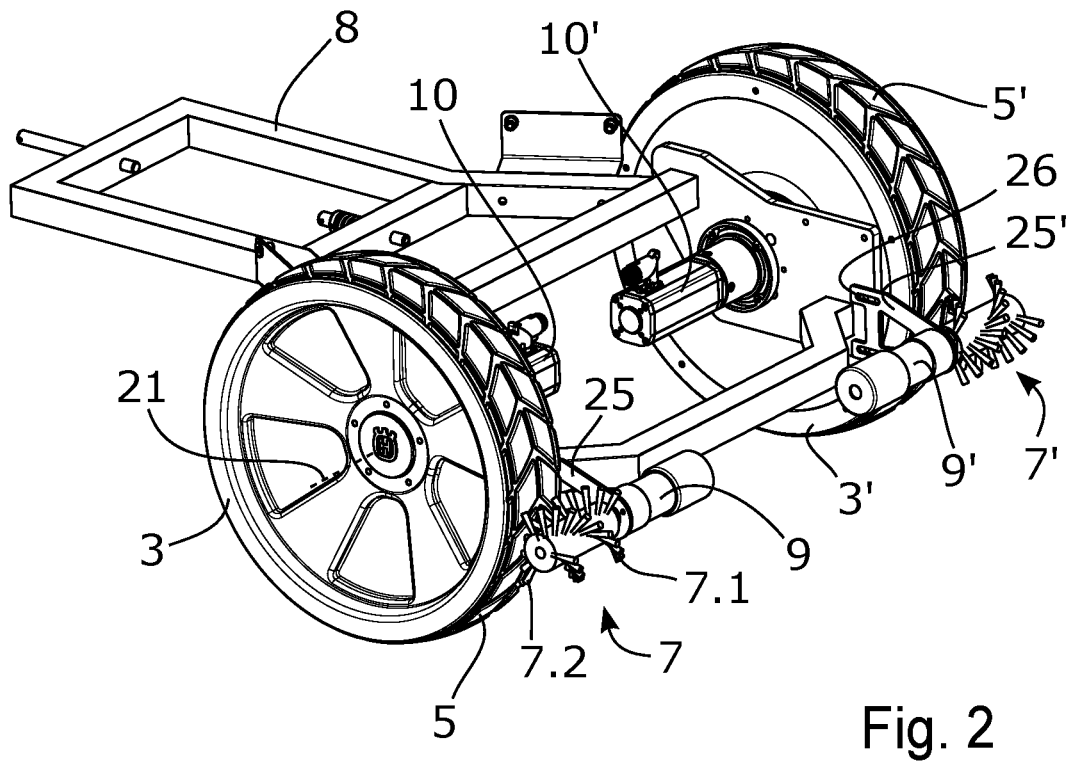
FIG. 2 illustrates a chassis, wheels, and a cleaning device of the lawnmower, illustrated in FIG. 1.

FIG. 2 illustrates a chassis 8, wheels 3, 3', and the cleaning device 7 of the lawnmower 1, illustrated in FIG. 1. In FIG. 2, a first wheel 3, and a second wheel 3' of the lawnmower are illustrated. Each wheel 3, 3' is powered by an electric motor 10, 10' to provide motive power to the lawnmower and steering of the lawnmower. As illustrated in FIG. 2, the lawnmower comprises an actuator 9 connected to the cleaning device 7. The actuator 9 is configured to move the cleaning device 7 relative the rolling surface 5 of the first wheel 3.

The build-up of grass onto various components of a lawnmower usually reduces the operational reliability of the lawnmower, deteriorates the visual cutting result, as well as deteriorates the uniformity of the cutting. In addition, the build-up of grass onto various components of a lawnmower limits the operational time available before the grass must be removed. In case grass is building up onto components of the lawnmower, it may fall of the lawnmower in clumps onto the lawn, which has a negative impact on the visual cutting result. In addition, such clumps of grass may annoy and disturb people who perform activities on the lawn. Further, such clumps of grass may also cause an uneven subsequent growth rate of grass, due to the uneven distribution of cut grass onto the lawn, and thus also an uneven distribution of nutrients, onto the lawn. Further, the build-up of grass onto components of the lawnmower may deteriorate the uniformity of the cutting by obstructing a wheel of the lawnmower, and/or by changing the ride-height of the lawnmower. Such deterioration of the uniformity of the cutting may also affect the visual cutting result in a negative manner.

Since the lawnmower 1 comprises the cleaning device 7 configured to clean the rolling surface 5 during operation of the lawnmower 1, and since the lawnmower 1 comprises the actuator 9 configured to move the cleaning device 7 relative the rolling surface 5 of the first wheel 3, a lawnmower is provided where the cleaning device 7 may remove grass from the rolling surface 5 of the wheel 3 in a more continuous manner. As a result thereof, the grass may be more evenly distributed from the lawnmower onto a lawn, which improves the visual cutting result, and avoids distribution of clumps of grass onto a lawn.

Still further, since the risk of build-up of grass onto the rolling surface 5 is significantly reduced, the risk is also significantly reduced of a deteriorated uniformity of the cutting result caused by an obstructed wheel 3, and/or a changed ride-height of the lawnmower, caused by grass on the rolling surface 5 of the wheel 3.

According to the illustrated embodiments, the lawnmower 1 further comprises a second cleaning device 7 configured to clean a rolling surface 5 of the second wheel 3' during operation of the lawnmower 1, and a second actuator 9' configured to move the second cleaning device 7' relative a rolling surface 5' of the second wheel 3'. The second cleaning device 7', and the second actuator 9' may comprise the same features and functions as the cleaning device 7 and the actuator 9, described herein. However, for the reason of clarity and brevity, the features and functions of the cleaning device 7 and the actuator 9 are described in detail herein. Further, the first wheel 3, referred to above, will be referred to as the "wheel 3" below.

Since the actuator 9 is configured to move the cleaning device 7 relative the rolling surface 5, the actuator 9 is also configured to move the cleaning device 7 relative the chassis 8 of the lawnmower, as well as relative a rotational axis 21 of the wheel 3. According to the illustrated embodiments, the cleaning device 7 is configured to clean the rolling surface 5 by abutting against matter on the rolling surface 5. The cleaning device 7 may be arranged at a position relative the rolling surface 5, such that portions 7.1, 7.2 of the cleaning device 7 abut against the rolling surface 5, or at a position relative the rolling surface 5, such that portions 7.1, 7.2 of the cleaning device 7 are close to the rolling surface 5, so as to abut against matter on the rolling surface 5.

Further, according to the illustrated embodiments, the actuator 9 is configured to move the cleaning device 7 relative the rolling surface 5 such that different portions 7.1, 7.2 of the cleaning device 7 face the rolling surface 5.

Figure 3:
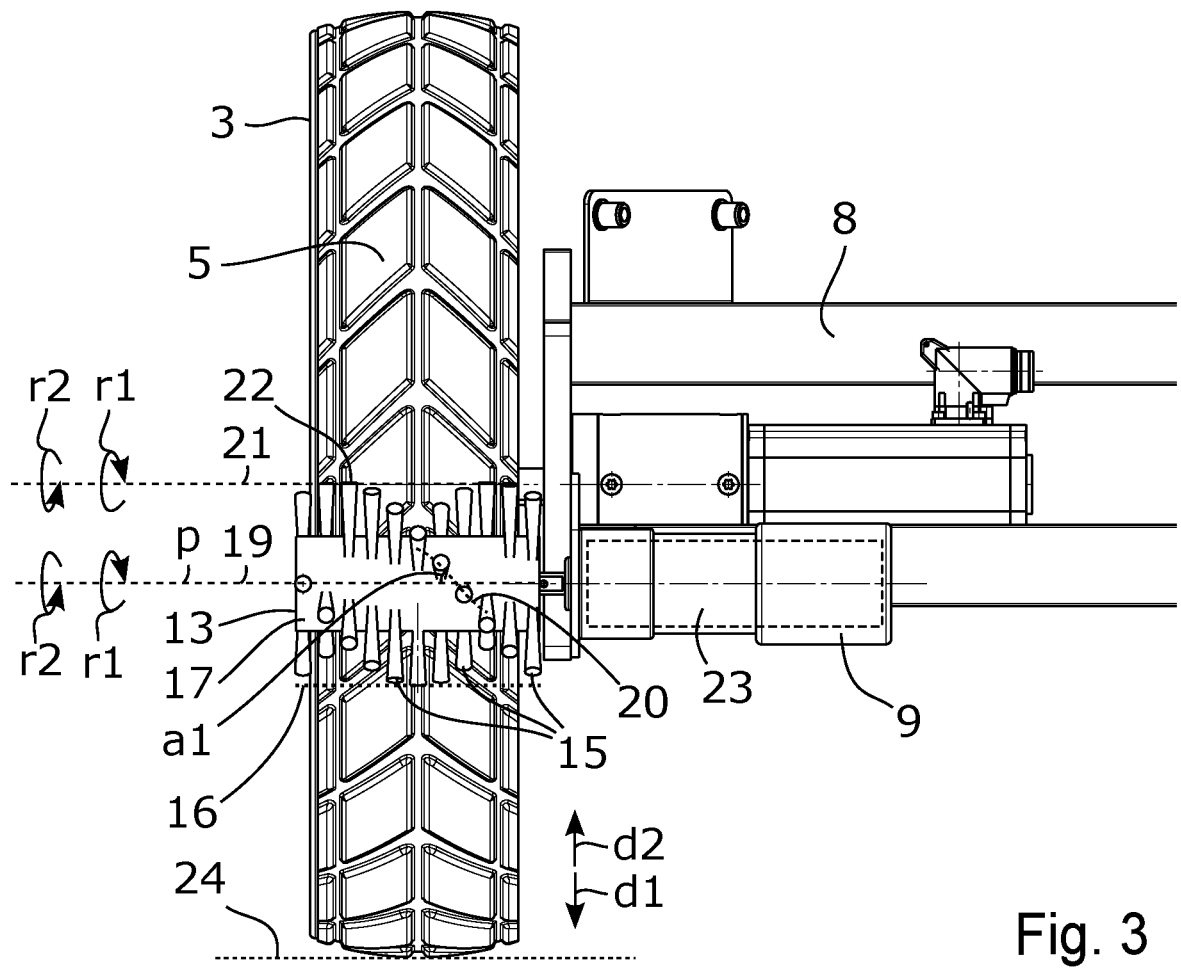
FIG. 3 illustrates an enlarged view of the chassis, a wheel, and the cleaning device, illustrated in FIG. 2.

FIG. 3 illustrates an enlarged view of a portion of the chassis 8, the wheel 3, and the cleaning device 7, illustrated in FIG. 2. According to the illustrated embodiments, the actuator 9 is configured to rotate the cleaning device 7 around a first rotational axis 19. The cleaning device 7 comprises a body 13 and bristles 15 extending from a surface 17 of the body 13. In embodiments where the cleaning device 7 comprises bristles 15, the cleaning device 7 may be referred to as a brush 7. The bristles 15 may be formed by a polymeric material, such as nylon and/or polyester. Further, according to the illustrated embodiments, the surface 17 of the body 13 is cylindrically shaped. A cylinder axis of the cylindrical surface 17 coincides with the first rotational axis 19. During rotation of the body 13 around the first rotational axis 19, portions of the surface 17 will face the rolling surface 5. The cleaning device 7 comprises a peripheral surface 16. According to the illustrated embodiments, the peripheral surface 16 is cylindrical and is defined by trajectories, during rotation of the cleaning device 7, of the free ends 22 of the bristles 15. Further, according to the illustrated embodiments, substantially the entire peripheral surface 16 will face the rolling surface 5 during one revolution of the cleaning device 7 around the first rotational axis 19. According to the illustrated embodiments, the bristles 15 cover approximately 6.5% of an area of the peripheral surface 16 of the cleaning device 7. According to further embodiments, the bristles 15 may cover 2.5%-30%, or 3.5%-20%, or 4%-12.5%, of the area of the peripheral surface 16. Further, according to the illustrated embodiments, each bristle 15 of the bristles 15 extends from the surface 17 of the body 13 to the peripheral surface 16. Furthermore, each bristle 15 of the bristles 15 is substantially radially oriented in relation to cylinder axis of the cylindrical surface 17 as well as in relation to the first rotational axis 19.

According to the illustrated embodiments, the bristles 15 cover approximately 13% of an area of the surface 17 of the body 13. According to further embodiments, the bristles 15 may cover 5%-60%, 7%-40%, 8%-25%, or 8%-17%, of the area of the surface 17 of the body 13. Thus, according to these embodiments, the surface 17 of the body 13 comprises portions comprising bristles 15 and portions lacking bristles 15, wherein the portions lacking bristles constitutes a significant portion of the area of the surface 17, and/or a major portion of the area of the surface 17. Likewise, according to these embodiments, the peripheral surface 16 of the cleaning device 7 comprises portions comprising bristles 15 and portions lacking bristles 15, wherein the portions lacking bristles constitutes a significant portion of the area of the peripheral surface 16 of the cleaning device 7, and/or a major portion of the area of the peripheral surface 16 of the cleaning device 7. As a result thereof, an efficient and reliable cleaning of the rolling surface 5 is performed. Further, the risk of build-up of grass on the cleaning device 7 is reduced.

Further, according to the illustrated embodiments, the bristles 15 cover the peripheral surface 16 in a pattern such that bristles 15 periodically faces the rolling surface 5 in a plane p comprising the first rotational axis 19 and a portion of the rolling surface 5. According to the illustrated embodiments, the bristles 15 are arranged in groups, wherein the groups are arranged in rows at the surface 17 with portions of the surface 17 lacking bristles 15 in-between the rows. According to the illustrated embodiments, the bristles 15 extend from the surface 17 in a spiral pattern along the first rotational axis 19. Further, the bristles 15 cover the peripheral surface 16 in a spiral pattern along the first rotational axis 19. According to the illustrated embodiments, an angle a1 between the plane p and a line 20 drawn through the groups of bristles 15 in a row is approximately 52 degrees. According to further embodiments, the angle a1 may be within the interval 20-75 degrees, 25-73 degrees, 30-70 degrees, 35-65 degrees, 40-63 degrees, or 45-60 degrees. The spiral pattern along the first rotational axis 19 within the ranges of the angle a1, given above, provides an efficient and reliable cleaning of the rolling surface 5, while build-up of grass onto the cleaning device 7 is avoided. One reason for the efficient cleaning of the rolling surface 5 may be that, due to the spiral formation, any matter on the rolling surface may be displaced by the rows of bristles 15, also in directions coinciding with the direction of the first rotational axis 19.

According to the illustrated embodiments, the at least one wheel 3 is arranged to rotate around a second rotational axis 21, and the first and second rotational axes 19, 21 are substantially parallel. The feature that the first and second rotational axes 19, 21 are substantially parallel may encompass that an angle between the first and second rotational axes 19, 21 is less than 20 degrees, less than 15 degrees, less than 10 degrees, or less than 5 degrees. The plane p, referred to herein, may be a plane p comprising the first rotational axis 19, the second rotational axis 21, and a portion of the rolling surface 5, wherein the portion of the rolling surface 5 is between the first and second axes 19, 21.

As indicated in FIG. 1, the lawnmower 1 is configured to move in a forward direction fd during operation, and the cleaning device 7 is arranged behind the wheel 3 seen in the forward direction fd. As indicated in FIG. 3, the wheel 3 is arranged to rotate in a first rotational direction r1 when the lawnmower 1 is moving in the forward direction fd. According to some embodiments, the actuator 9 is configured to rotate the cleaning device 7 in the first rotational direction r1.

As a result, a portion of the cleaning device 7 that faces a portion of the rolling surface 5 in the plane p, will move in a tangential direction d1 being opposite to the moving direction d2 of the portion of the rolling surface 5, and a high relative velocity is obtained between the portion of the cleaning device 7 and the portion of the rolling surface 5. Further, according to such embodiments, any matter on the rolling surface 5 may be brushed off the rolling surface 5 in the direction d1, indicated in FIG. 3, i.e. in a direction towards a ground surface 24. Thus, according to these embodiments, an object that sticks to a portion of the rolling surface 5, when the portion of the rolling surface 5 is abutting against the ground surface 24, will travel a relative short distance from the ground surface 24 before being brushed off the rolling surface 5 by the cleaning device 7. Further, as can be seen in FIG. 3, according to the illustrated embodiments, the cleaning device 7 is arranged at a position relative the wheel 3 such that the first rotational axis 19 is closer to the ground surface 24 than the second rotational axis 21. As a result thereof, it is further ensured that an object that sticks to a portion of the rolling surface 5, when the portion of the rolling surface 5 is abutting against the ground surface 24, will travel a relative short distance from the ground surface 24 before being brushed off the rolling surface 5 by the cleaning device 7.

According to some embodiments, the actuator 9 is configured to rotate the cleaning device 7 in a second rotational direction r2, opposite to the first rotational direction r1. According to such embodiments, the actuator 9 may be configured to rotate the cleaning device 7 in a rotational velocity causing outer radial portions 22 of the cleaning device 7 to obtain a higher tangential velocity than a tangential velocity of the rolling surface 5. According to the illustrated embodiments, the outer radial portions 22 of the cleaning device 7 is outer radial portions 22 of the bristles 15 of the cleaning device 7, i.e. free ends of the bristles 15. Due to these features, a lawnmower 1 is provided capable of cleaning the rolling surface 5 in a more energy efficient manner. This because outer radial portions 22 of the cleaning device 7 that faces a portion of the rolling surface 5, will move in the same tangential direction as the portion of the rolling surface 5. Accordingly, outer radial portions 22 of the cleaning device 7 may abut against the rolling surface 5, or abut against matter on the rolling surface 5, and may, as a result thereof, contribute to the rotation of the wheel 3. According to these embodiments, the cleaning device 7 may be arranged in front of the wheel 3 seen in the forward direction fd, indicated in FIG. 1. Thereby, any matter on the rolling surface 5 may be brushed off the rolling surface 5 in the direction towards a ground surface 24.

According to the illustrated embodiments, the actuator 9 comprises an electric motor 23. The electric motor 23 may be configured to rotate the cleaning device 7 directly, or via a transmission. According to further embodiments, the actuator, as referred to herein, may comprise a transmission configured to move the cleaning device 7 relative the rolling surface 5 by transferring rotation of the wheel 3 to movement of the cleaning device 7, e.g. transferring rotation of the wheel 3 to rotation of the cleaning device 7. Such a transmission may for example comprise a belt-arrangement, a chain and sprocket arrangement, and/or a gear arrangement, configured to transfer rotation of the wheel 3 to movement of the cleaning device 7, e.g. configured to transfer rotation of the wheel 3 to rotation of the cleaning device 7.

According to the embodiments illustrated in FIG. 2, the lawnmower comprises two actuators 9, 9' each configured to move a cleaning device 7, 7' relative a rolling surface 5, 5'. According to further embodiments, the lawnmower may comprise one actuator configured to move two cleaning devices 7, 7' at a respective rolling surface 5, 5'. Such an actuator may comprise an electric motor connected to the two cleaning devices 7, 7', for example via elongated shafts. Further, such an actuator may comprise a belt-arrangement, a chain and sprocket arrangement, and/or a gear arrangement, configured to transfer rotation of one or more wheels 3, 3' to movement of the two cleaning devices 7, 7', e.g. configured to transfer rotation of one or more wheels 3, 3' to rotation of the two cleaning devices 7, 7'.

According to the embodiments illustrated in FIG. 2, the lawnmower 1 further comprises an adjustment mechanism 25. The cleaning device 7 is mounted onto the lawnmower 1 via the adjustment mechanism 25. The adjustment mechanism 25 is configured to allow adjustment between different relative distances between the cleaning device 7 and the rolling surface 5. Further, as indicated in FIG. 2, the lawnmower 1 further comprises a second adjustment mechanism 25', wherein the second cleaning device 7' is mounted onto the lawnmower 1 via the second adjustment mechanism 25'. As indicated at the second adjustment mechanism 25', the second adjustment mechanism 25' comprises a bracket provided with slits 26. A portion of the chassis 8 comprises threaded holes. The second adjustment mechanism 25' is configured to be fastened to the chassis 8 by fasteners extending through the slits 26 into the threaded holes. Thereby, a user can adjust the relative distance between the second cleaning device 7' and the rolling surface 5' by loosing the fasteners and displacing the second adjustment mechanism 25' relative the chassis 8. According to the illustrated embodiments, the adjustment mechanism 25 comprises the same features and functions as the second adjustment mechanism 25'. According to further embodiments, the adjustment mechanism 25, and/or the second adjustment mechanism 25' may comprise an actuator configured to adjust the relative distance between a cleaning device 7, 7' and a rolling surface 5, 5', as is further explained herein.

According to the illustrated embodiments, and as indicated in FIG. 1, the lawnmower 1 comprises a control arrangement 27 configured to control operation of the actuator 9 based on a cleaning need of the rolling surface 5. Further, according to the illustrated embodiments, the lawnmower 1 further comprises a sensor 29, wherein the control arrangement 27 is configured to determine the cleaning need based on data from the sensor 29. According to the illustrated embodiments, the sensor 29 comprises an antenna configured to receive signals from an external sender 29'. The external sender 29' may send signals representative of a humidity, a weather condition, and a length of grass, in an environment surrounding the lawnmower 1. As an alternative, or in addition, the external sender 29' may send instructions to the control arrangement 27 to perform cleaning of the rolling surface 5, or to cancel cleaning of the rolling surface 5. Such instructions may be based on factors such as humidity, weather condition, and a length of grass, in an environment surrounding the lawnmower 1. According to further embodiments, the sensor 29 may comprise one or more humidity sensors, one or more thermometers, and/or one or more imaging units, such as one or more cameras. Further, the sensor 29 may comprise one or more sensors arranged at the chassis 8 in a region of a rolling surface 5 to detect presence of matter on the rolling surface 5. For example, such a sensor may comprise an element arranged at a distance from a rolling surface 5, wherein the element is configured to be displaced when matter on the rolling surface 5 abuts against the element.

The humidity, the weather condition, and the length of grass, in the environment surrounding the lawnmower 1, are indicative of the cleaning need of the rolling surface 7. This because if the humidity is high, for example due to rain, and if there is a great length of the grass, a greater amount of grass will stick to the rolling surface 5, than if the humidity is low, if there is a short length of the grass.

The control arrangement 27 may be configured to control operation of the actuator 9 based on a cleaning need of the rolling surface 5, in a manner such that the control arrangement 27 controls the actuator 9 to move the cleaning device 7 if the cleaning need of the rolling surface 5 is above a threshold value, and to control the actuator 9 to cancel movement of the cleaning device 7 if the cleaning need of the rolling surface 5 is below the threshold value. As an alternative, or in addition, the control arrangement 27 may be configured to control the actuator 9 to move the cleaning device 7 in a higher operational velocity if the cleaning need of the rolling surface 5 is above a threshold value, and to control the actuator 9 to move the cleaning device 7 in a lower operational velocity if the cleaning need of the rolling surface 5 is below the threshold value. As a further alternative, or in addition, the control arrangement 27 may be configured to control an actuator to reduce a relative distance between a cleaning device 7 and a rolling surface 5 if the cleaning need of the rolling surface 5 is above a threshold value, and to control the actuator to increase the distance between a cleaning device 7 and a rolling surface 5 if the cleaning need of the rolling surface 5 is below the threshold value.

Figure 4:
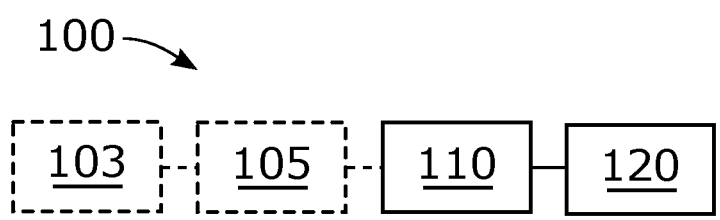
FIG. 4 illustrates a method of cleaning a rolling surface of at least one wheel of a lawnmower.

FIG. 4 illustrates a method 100 of cleaning a rolling surface of at least one wheel of a lawnmower. The lawnmower may be a lawnmower 1, according to the embodiments described with reference to FIG. 1-FIG. 3. Therefore, below, reference is made to FIG. 4, as well as to FIG. 1-FIG. 3. The method 100 is a method 100 of cleaning a rolling surface 5 of at least one wheel 3 of a lawnmower 1, wherein the lawnmower 1 comprises the at least one wheel 3, a cleaning device 7, and an actuator 9, wherein the at least one wheel 3 is configured to support the lawnmower 1 during operation, and wherein the method 100 comprises:
cleaning 110 the rolling surface 5, using the cleaning device 7, and
moving 120 the cleaning device 7 relative the rolling surface 5, during the cleaning 110 of the rolling surface 5, using the actuator 9.

According to some embodiments, the lawnmower 1 comprises a control arrangement 27, and as illustrated in FIG. 4, the method 100 may comprise:

controlling 105 operation of the actuator 9, based on a cleaning need of the rolling surface 5.

According to some embodiments, the lawnmower 1 comprises a sensor 29, and as illustrated in FIG. 4, the method 100 may comprise:
determining 103 the cleaning need based on data from the sensor 29.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A lawnmower comprising at least one wheel configured to support the lawnmower during operation, wherein the at least one wheel comprises a rolling surface,
and wherein the lawnmower further comprises:
a cleaning device configured to clean the rolling surface, and
an actuator configured to move the cleaning device relative the rolling surface, and
wherein the actuator comprises an electric motor, or
wherein the lawnmower is a self-propelled robotic lawnmower.

2. The lawnmower according to claim 1, wherein the cleaning device is configured to clean the rolling surface by abutting against matter on the rolling surface.

3. The lawnmower according to claim 1, wherein the actuator is configured to move the cleaning device relative the rolling surface such that different portions of the cleaning device face the rolling surface.

4. The lawnmower according to claim 1, wherein the actuator is configured to rotate the cleaning device around a first rotational axis.

5. The lawnmower according to claim 4, wherein the cleaning device comprises a body and bristles extending from the body.

6. The lawnmower according to claim 5, wherein the cleaning device comprises a peripheral surface, wherein the peripheral surface, at least periodically, faces the rolling surface during movement of the cleaning device, and wherein the bristles cover 2.5%-30%, or 3.5%-20%, or 4%-12.5%, of an area of the peripheral surface.

7. The lawnmower according to claim 5, wherein the bristles cover the peripheral surface in a pattern such that the bristles periodically face the rolling surface in a plane comprising the first rotational axis and a portion of the rolling surface.

8. The lawnmower according to claim 7, wherein the bristles cover the peripheral surface in a spiral pattern along the first rotational axis.

9. The lawnmower according to claim 4, wherein the at least one wheel is arranged to rotate around a second rotational axis, and wherein the first and second rotational axes are substantially parallel.

10. The lawnmower according to claim 9, wherein the lawnmower is configured to move in a forward direction during operation, wherein the at least one wheel is arranged to rotate in a first rotational direction when the lawnmower is moving in the forward direction, and wherein the actuator is configured to rotate the cleaning device in the first rotational direction.

11. The lawnmower according to claim 1, wherein the lawnmower is configured to move in a forward direction (fd) during operation, and wherein the cleaning device is arranged behind the wheel seen in the forward direction.

12. The lawnmower according to claim 9, wherein the lawnmower is configured to move in a forward direction during operation, wherein the at least one wheel is arranged to rotate in a first rotational direction when the lawnmower is moving in the forward direction, wherein the actuator is configured to rotate the cleaning device in a second rotational direction, opposite to the first rotational direction, and wherein the actuator is configured to rotate the cleaning device in a rotational velocity causing outer radial portions of the cleaning device to obtain a higher tangential velocity than a tangential velocity of the rolling surface.

13. The lawnmower according to claim 1, wherein the lawnmower further comprises an adjustment mechanism, wherein the cleaning device is mounted onto the lawnmower via the adjustment mechanism, and wherein the adjustment mechanism is configured to allow adjustment between different relative distances between the cleaning device and the rolling surface.

14. The lawnmower according to claim 1, wherein the lawnmower comprises a control arrangement configured to control operation of the actuator based on a cleaning need of the rolling surface.

15. A lawnmower comprising at least one wheel configured to support the lawnmower during operation, wherein the at least one wheel comprises a rolling surface, wherein the lawnmower further comprises:
a cleaning device configured to clean the rolling surface,
an actuator configured to move the cleaning device relative the rolling surface,
a control arrangement configured to control operation of the actuator based on a cleaning need of the rolling surface,
wherein the lawnmower further comprises a sensor, and wherein the control arrangement is configured to determine the cleaning need based on data from the sensor.

16. The lawnmower according to claim 15, wherein the sensor is configured to sense at least one of a humidity, a weather condition, and a length of grass, in an environment surrounding the lawnmower.

17. A method of cleaning a rolling surface of at least one wheel of a lawnmower, wherein the lawnmower comprises the at least one wheel, a cleaning device, an actuator, a control arrangement, and a sensor, wherein the at least one wheel is configured to support the lawnmower during operation,
and wherein the method comprises:
cleaning the rolling surface, using the cleaning device,
moving the cleaning device relative the rolling surface, during the cleaning of the rolling surface,
controlling operation of the actuator, based on a cleaning need of the rolling surface, and
determining the cleaning need based on data from the sensor.

* * * * *